US010364751B2

(12) United States Patent
Ryon et al.

(10) Patent No.: US 10,364,751 B2
(45) Date of Patent: Jul. 30, 2019

(54) FUEL STAGING

(71) Applicant: Delavan Inc, West Des Moines, IA (US)

(72) Inventors: Jason A. Ryon, Carlisle, IA (US); Philip E. Buelow, West Des Moines, IA (US); Lev A. Prociw, Johnston, IA (US)

(73) Assignee: Delavan Inc, West Des Moines, IA (US)

( * ) Notice: Subject to any disclaimer, the term of this patent is extended or adjusted under 35 U.S.C. 154(b) by 400 days.

(21) Appl. No.: 14/816,979

(22) Filed: Aug. 3, 2015

(65) Prior Publication Data

US 2017/0037783 A1    Feb. 9, 2017

(51) Int. Cl.
| F23R 3/34 | (2006.01) |
| F02C 7/22 | (2006.01) |
| F23R 3/28 | (2006.01) |
| F23N 1/00 | (2006.01) |
| F23D 14/64 | (2006.01) |
| F23D 14/62 | (2006.01) |

(52) U.S. Cl.
CPC .............. *F02C 7/222* (2013.01); *F23N 1/002* (2013.01); *F23R 3/28* (2013.01); *F23R 3/346* (2013.01); *F23D 14/62* (2013.01); *F23D 14/64* (2013.01); *F23R 3/286* (2013.01); *F23R 3/343* (2013.01)

(58) Field of Classification Search
CPC .. F02C 7/222; F02C 7/232; F23R 3/28; F23R 3/286; F23R 3/343; F23D 14/62; F23D 14/64; F23N 1/002
USPC .......................................................... 60/737
See application file for complete search history.

(56) References Cited

U.S. PATENT DOCUMENTS 4,305,255 A * 12/1981 Davies ...................... F02C 7/22
                                                    60/741
4,467,610 A *  8/1984 Pearson .................. F02C 7/222
                                                    138/114
6,321,541 B1* 11/2001 Wrubel .................. G11C 7/222
                                                    60/740

(Continued)

FOREIGN PATENT DOCUMENTS

| EP | 1369644 A1 | 12/2003 |
| EP | 2829707 A1 | 1/2015 |

OTHER PUBLICATIONS

Extended European Search Report dated Jan. 19, 2017, issued during the prosecution of corresponding European Patent Application No. 16182353.9 (8 pages).

*Primary Examiner* — Todd E Manahan
*Assistant Examiner* — Eric W Linderman
(74) *Attorney, Agent, or Firm* — Locke Lord LLP; Scott D. Wofsy; Joshua L. Jones

(57) ABSTRACT

A fuel injector includes a feed arm with an inlet end and a nozzle body extending from the feed arm at an end opposite the inlet end. The nozzle body defines a prefilming chamber that opens into an annular outlet orifice for issuing a spray therefrom. A plurality of fuel circuits is defined from the inlet end of the feed arm to the prefilming chamber of the nozzle body. Each fuel circuit in the plurality of fuel circuits can include a single respective inlet opening at the inlet end of the feed arm, with a single respective conduit extending through the feed arm and nozzle body from the single respective inlet opening to a single respective outlet slot feeding into the prefilming chamber.

11 Claims, 4 Drawing Sheets

(56) References Cited

U.S. PATENT DOCUMENTS

| | | | |
|---|---|---|---|
| 6,393,823 B1 | 5/2002 | Badeer | |
| 6,547,163 B1* | 4/2003 | Mansour | B05B 1/3405 239/404 |
| 6,622,488 B2* | 9/2003 | Mansour | F23D 11/107 239/403 |
| 6,718,770 B2 | 4/2004 | Laing et al. | |
| 7,036,302 B2 | 5/2006 | Myers, Jr. et al. | |
| 7,841,368 B2* | 11/2010 | McMasters | B23P 6/007 138/109 |
| 7,891,193 B2* | 2/2011 | Hernandez | F23D 11/36 239/132.5 |
| 8,001,761 B2 | 8/2011 | Myers, Jr. et al. | |
| 8,096,135 B2 | 1/2012 | Caples | |
| 8,459,034 B2 | 6/2013 | Snider et al. | |
| 8,636,263 B2 | 1/2014 | Deaton et al. | |
| 8,769,954 B2* | 7/2014 | Fiebig | F02C 7/222 60/734 |
| 8,984,889 B2* | 3/2015 | Wilbraham | F23R 3/14 60/737 |
| 9,046,039 B2 | 6/2015 | Williams et al. | |
| 9,068,508 B2* | 6/2015 | Fish | F02C 7/222 |
| 9,157,635 B2* | 10/2015 | Bailey | F02C 7/222 |
| 9,188,341 B2* | 11/2015 | McMasters | F02K 9/52 |
| 9,567,910 B2* | 2/2017 | Fuller | F02C 7/222 |
| 9,765,972 B2* | 9/2017 | Zink | F23R 3/28 |
| 9,790,862 B2* | 10/2017 | Fuller | F02C 7/222 |
| 2002/0134084 A1* | 9/2002 | Mansour | F23D 11/107 60/740 |
| 2003/0221429 A1* | 12/2003 | Laing | F23D 11/36 60/740 |
| 2004/0040306 A1* | 3/2004 | Prociw | F02C 7/222 60/740 |
| 2004/0148938 A1* | 8/2004 | Mancini | F23R 3/343 60/740 |
| 2006/0107666 A1* | 5/2006 | Kothnur | F02C 7/222 60/773 |
| 2006/0283193 A1* | 12/2006 | Nilsson | F23K 5/18 60/776 |
| 2007/0163263 A1* | 7/2007 | Thomson | F23R 3/343 60/773 |
| 2007/0204621 A1* | 9/2007 | Fish | F02C 7/222 60/739 |
| 2008/0072599 A1* | 3/2008 | Morenko | F02C 3/145 60/734 |
| 2008/0083223 A1* | 4/2008 | Prociw | F02C 7/222 60/739 |
| 2008/0092543 A1* | 4/2008 | Berg | F02C 6/08 60/734 |
| 2009/0158743 A1* | 6/2009 | Francis | F02C 7/222 60/748 |
| 2009/0173074 A1* | 7/2009 | Johnson | F23R 3/10 60/737 |
| 2009/0255258 A1* | 10/2009 | Bretz | F23D 11/107 60/737 |
| 2009/0277176 A1* | 11/2009 | Caples | F02C 7/222 60/737 |
| 2009/0293482 A1* | 12/2009 | Davis, Jr. | F23D 14/82 60/737 |
| 2010/0051726 A1* | 3/2010 | Houtman | F02C 7/222 239/548 |
| 2010/0071663 A1* | 3/2010 | Patel | F02C 7/222 123/456 |
| 2010/0300105 A1* | 12/2010 | Pelletier | F23D 11/103 60/740 |
| 2011/0067403 A1* | 3/2011 | Williams | F23R 3/343 60/742 |
| 2012/0047903 A1* | 3/2012 | Williams | F02C 7/22 60/746 |
| 2012/0167580 A1* | 7/2012 | Roesler | F23R 3/28 60/772 |
| 2012/0234013 A1* | 9/2012 | Overman | F23C 9/006 60/772 |
| 2013/0247574 A1* | 9/2013 | Patel | F02C 7/222 60/734 |
| 2014/0075949 A1 | 3/2014 | Prociw | |
| 2014/0116066 A1* | 5/2014 | Melton | F23R 3/28 60/806 |
| 2014/0157787 A1 | 6/2014 | Bathina et al. | |
| 2014/0291418 A1* | 10/2014 | Ruffing | F23R 3/14 239/403 |
| 2015/0027100 A1 | 1/2015 | Qin et al. | |
| 2015/0047361 A1* | 2/2015 | Williams | F23R 3/343 60/746 |
| 2015/0059348 A1 | 3/2015 | Toronto et al. | |
| 2015/0069148 A1* | 3/2015 | Ryon | F23R 3/283 239/397.5 |
| 2015/0135716 A1* | 5/2015 | Ginessin | F23R 3/28 60/737 |
| 2015/0211742 A1* | 7/2015 | Lee | F23R 3/286 60/772 |
| 2016/0223201 A1* | 8/2016 | Zink | F23R 3/28 |
| 2016/0237911 A1* | 8/2016 | Chabaille | F23R 3/343 |
| 2016/0238255 A1* | 8/2016 | Ryon | B05B 7/10 |
| 2016/0273458 A1* | 9/2016 | Kim | F02C 9/28 |
| 2016/0348913 A1* | 12/2016 | Ott | F23R 3/28 |
| 2016/0363319 A1* | 12/2016 | Monahan | F23R 3/286 |
| 2017/0074521 A1* | 3/2017 | Horikawa | F02C 7/232 |
| 2017/0122211 A1* | 5/2017 | Zhang | F02C 7/222 |
| 2017/0138267 A1* | 5/2017 | Hughes | F02C 7/222 |
| 2017/0184307 A1* | 6/2017 | Patel | F23R 3/28 |
| 2017/0248318 A1* | 8/2017 | Kulkarni | F02C 7/222 |
| 2017/0261209 A9* | 9/2017 | Ginessin | F23R 3/286 |

* cited by examiner

FUEL STAGING

BACKGROUND OF THE INVENTION

1. Field of the Invention

The present disclosure relates to injection systems, and more particularly to fuel injection such as used in gas turbine engines.

2. Description of Related Art

A variety of devices and methods are known in the art for fuel injection. Of such devices, many are directed to staged fuel injection, such as in gas turbine engines. In traditional configurations, two or three fuel stages are provided, such as to concentric respective spray orifices. For example, at a low power setting only a pilot stage is needed, whereas at higher power levels, a second or even third fuel stage radially outboard of the pilot stage can be used in addition to the pilot stage to increase the flow rate of the fuel issued. This kind of staging typically involves use of a check or scheduling valve in each injector for activating/deactivating the various fuel stages based on inlet pressure at a manifold that supplies fuel to the injectors. Empty fuel manifolds in an active engine are not desirable due to the unknown response times required to fill the manifold on demand.

Such conventional methods and systems have generally been considered satisfactory for their intended purpose. However, there is still a need in the art for improved staged fuel injection. The present disclosure provides a solution for this need.

SUMMARY OF THE INVENTION

A fuel injector includes a feed arm with an inlet end and a nozzle body extending from the feed arm at an end opposite the inlet end. The nozzle body defines a prefilming chamber that opens into an annular outlet orifice for issuing a spray therefrom. A plurality of fuel circuits is defined from the inlet end of the feed arm to the prefilming chamber of the nozzle body.

The nozzle body can define an airblast nozzle with an outer air circuit defined outboard of the prefilming chamber, and with an inner air circuit defined inboard of the prefilming chamber, for airblast injection of fuel from the outlet orifice.

The fuel circuits can be in fluid isolation from one another from the inlet end of the feed arm to the prefilming chamber. The plurality of fuel circuits can include at least three fuel circuits in fluid isolation from one another from the inlet end of the feed arm to the prefilming chamber.

Each fuel circuit in the plurality of fuel circuits can include a single outlet slot feeding into the prefilming chamber. Each of the fuel circuits can include a single respective conduit extending through the nozzle body from the feed arm to a single outlet slot feeding into the prefilming chamber. It is also contemplated that each fuel circuit in the plurality of fuel circuits can include a single respective inlet opening at the inlet end of the feed arm, with a single respective conduit extending through the feed arm and nozzle body from the single respective inlet opening to a single respective outlet slot feeding into the prefilming chamber.

Each fuel circuit can terminate at an outlet slot that is a metering orifice opening into the prefilming chamber. Each metering orifice can open at an angle of 30° to 60° relative to the circumference of the prefilming chamber so that a substantially uniform spray can issue from the outlet orifice even if only one of the fuel circuits is active.

A fuel injection system includes a fuel manifold assembly defining a plurality of fuel feed circuits. The system also includes a plurality of fuel injectors as in any of the embodiments described above, wherein for each of the fuel injectors, each of the fuel circuits is in fluid communication with a respective one of the fuel feed circuits.

Each of the fuel feed circuits can include a respective valve for controlling flow to a respective individual fuel circuit in each fuel injector. It is also contemplated that a control system can be operatively connected to the fuel manifold assembly to individually control fuel circuits of individual fuel injectors in the plurality of fuel injectors independent of the fuel circuits of the other fuel injectors.

The fuel feed circuits can all be defined as internal passages within a single manifold ring. The manifold ring can be circumferentially segmented into a plurality of manifold segments. For a plurality of the manifold segments, each can include a respective junction connecting between a respective one of the fuel injectors and the respective manifold segment, wherein a respective fuel feed circuit branch connects between each respective fuel feed circuit and a respective fuel circuit of the respective one of the fuel injectors.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
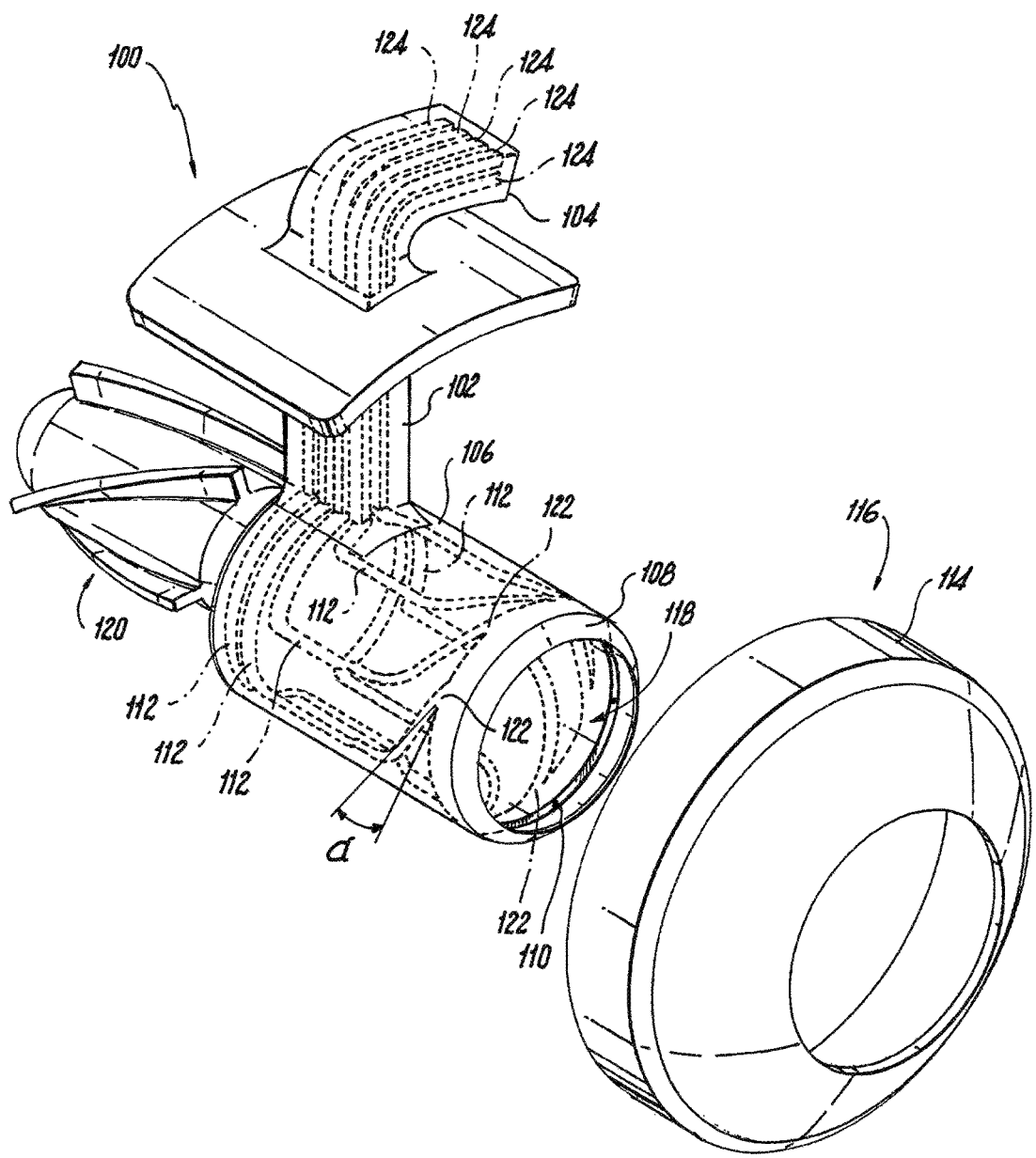
FIG. 1 is a schematic exploded perspective view of an exemplary embodiment of an injector constructed in accordance with the present disclosure, showing a plurality of fuel circuits internal to the injector.

Reference will now be made to the drawings wherein like reference numerals identify similar structural features or aspects of the subject disclosure. For purposes of explanation and illustration, and not limitation, a partial view of an exemplary embodiment of an injector in accordance with the disclosure is shown in FIG. 1 and is designated generally by reference character 100. Other embodiments of injectors in accordance with the disclosure, or aspects thereof, are provided in FIGS. 2-4, as will be described. The systems and methods described herein can be used to stage fuel in fuel systems, such as in gas turbine engines.

Figure 2:
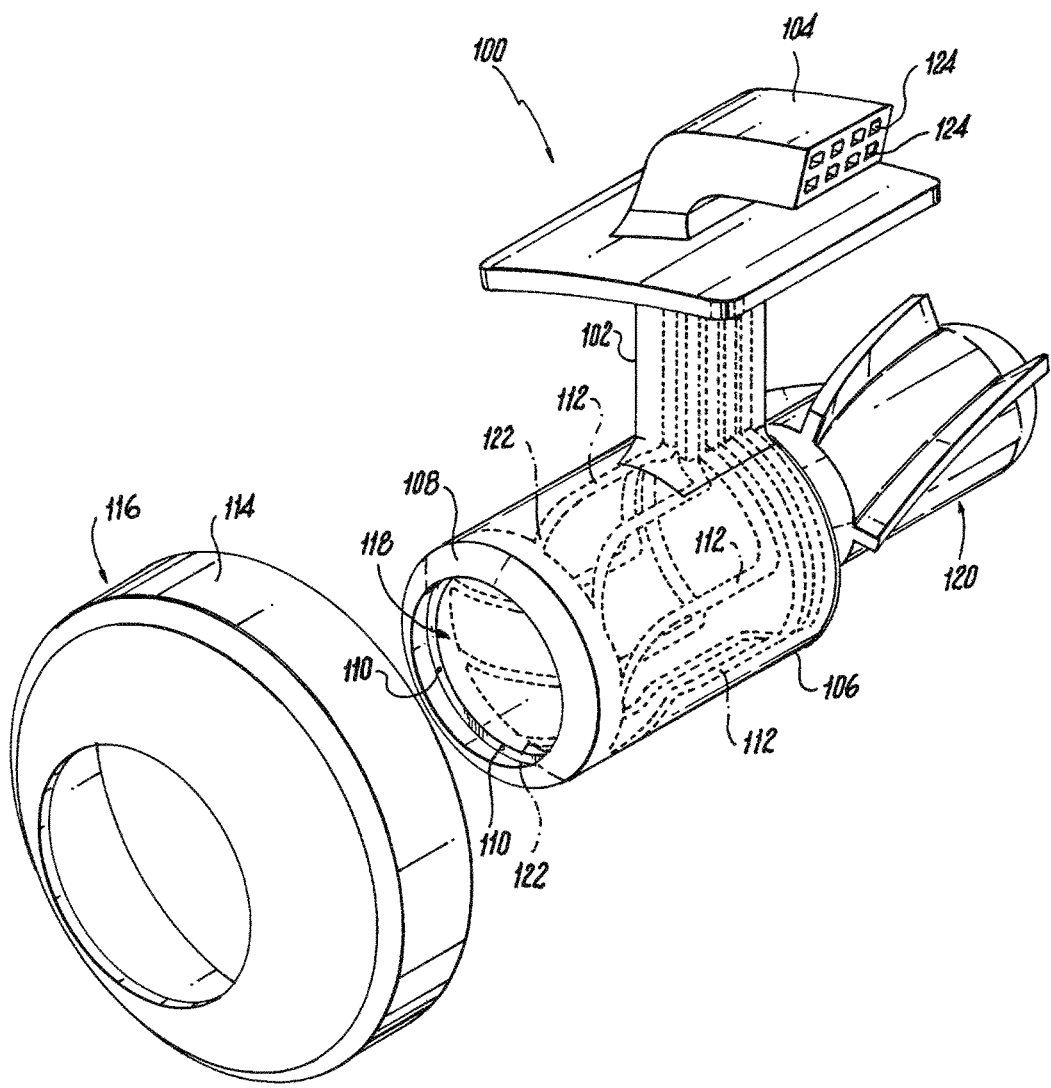
FIG. 2 is a schematic perspective view of the injector of FIG. 1, showing the injector with internal fuel circuits from a side opposite that shown in FIG. 1.

Fuel injector 100 includes a feed arm 102 with an inlet end 104 and a nozzle body 106 extending from feed arm 102 at an end of feed arm 102 opposite the inlet end 104. Nozzle body 106 defines a prefilming chamber 108 that opens into an annular outlet orifice 110 for issuing a spray therefrom. A plurality of fuel circuits 112 is defined from inlet end 104 of feed arm 102 to the prefilming chamber 108 of nozzle body 106. In the example shown in FIG. 1, there are eight fuel circuits 112, and FIG. 2 shows injector 100 from the side opposite that shown in FIG. 1 to show the fuel circuits 112 from both sides. While the fuel circuits 112 and prefilming chamber 108 are internal features, they are shown in solid lines in FIGS. 1 and 2 as though injector 100 were transparent for sake of clarity. Those skilled in the art will readily appreciate that while eight fuel circuits are shown as an example, any suitable number of fuel circuits can be used without departing from the scope of this disclosure. For example, the systems and methods designed herein can greatly facilitate using three or more fuel circuits connecting to a single prefilming chamber compared to using the same number of fuel circuits in traditional systems.

Nozzle body 100 defines an airblast nozzle with an outer air circuit 116 defined outboard of prefilming chamber 108, and with an inner air circuit 118 defined inboard of prefilming chamber 108, for airblast injection of fuel from outlet orifice 110. In the example of FIG. 1, the outer air circuit is defined between outer air cap 114 and the portion of nozzle body 102 defining prefilming chamber 108. Outer air cap 114 defines an axial swirler with an outlet that converges toward outlet orifice 110, however, any other suitable type of outer air circuit can be used. An axial air swirler 120 is mounted inside inner air circuit 118, however inner air circuit 118 can be of any other suitable type.

The fuel circuits 112 are in fluid isolation from one another all the way from inlet end 104 of feed arm 102 to prefilming chamber 108. Each fuel circuit 112 includes a single outlet slot 122 feeding into prefilming chamber 108. Each of the fuel circuits 112 includes a single respective conduit extending through nozzle body 106 from feed arm 102 to a single outlet slot 122 feeding into prefilming chamber 108. Moreover, each fuel circuit 112 includes a single respective inlet opening 124 at inlet end 104 of feed arm 102, with a single respective conduit extending through feed arm 102 and nozzle body 106 from the single respective inlet opening 124 to a single respective outlet slot 122 feeding into prefilming chamber 108.

Each fuel circuit 112 terminates at an outlet slot 122 that is a metering orifice opening into the prefilming chamber 108. Thus each fuel circuit 112 is metered. When multiple injectors are connected to a single manifold, as described below, the metering orifices of the respective fuel circuits 112 help ensure even mass flow issues from each active fuel circuit 112. Each metering orifice, i.e. outlet slot 122, can open at an angle $\alpha$ of 30° to 60° relative to the circumference of prefilming chamber 108 so that a substantially uniform spray can issue from outlet orifice 110 even if only one of the fuel circuits 112 is active. This way, individual fuel circuits 112 can be staged on together or independently, and due to the high degree of tangential spin in the flow in prefilming chamber 108, a substantially uniform annular spray will issue at outlet orifice 110 regardless of which fuel circuits 112 are active. Those skilled in the art will readily appreciate that any other suitable angle $\alpha$, e.g., near zero to 90°, can be used as suited to an application by application basis.

Figure 3:
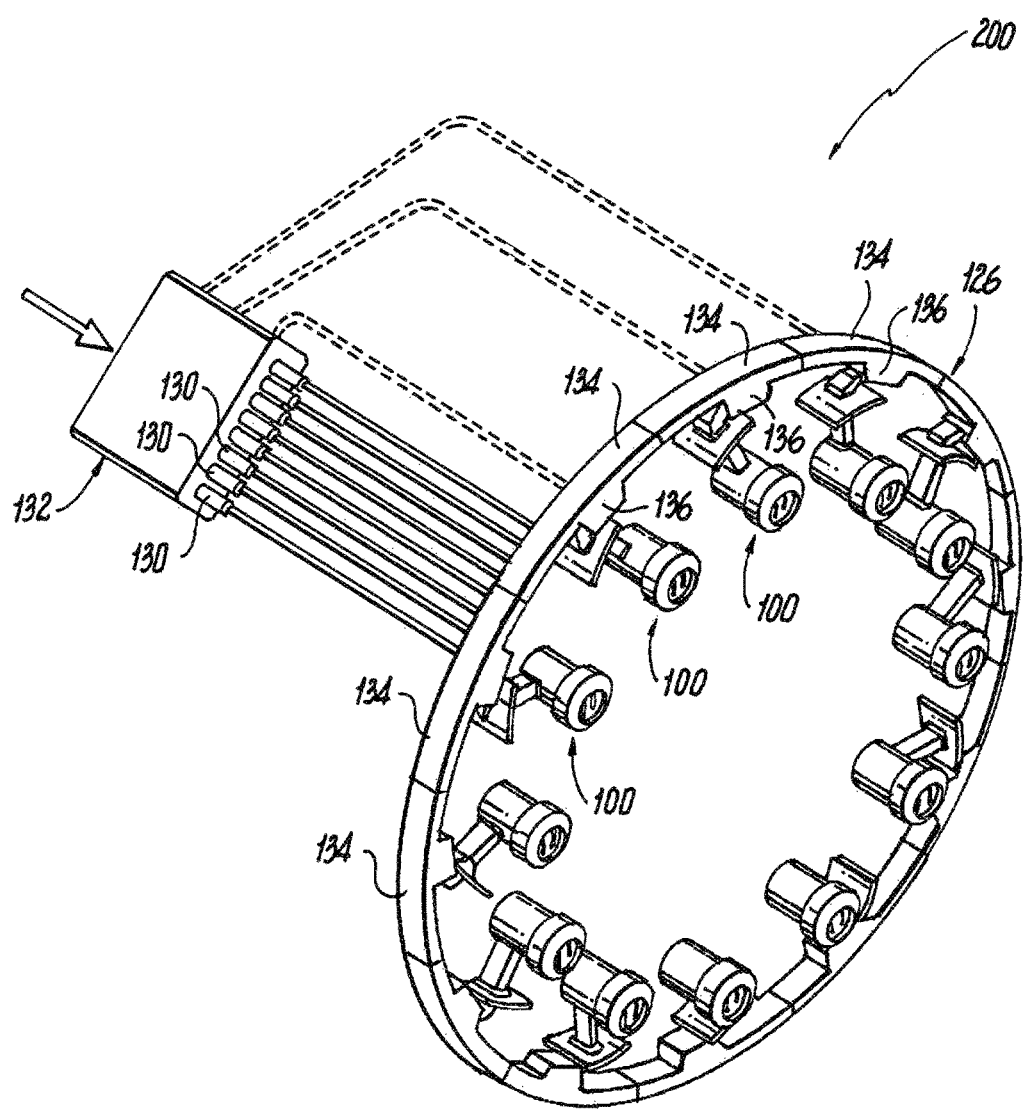
FIG. 3 is a schematic perspective view of an exemplary embodiment of a fuel injection system including injectors as shown in FIG. 1, showing the fuel injectors connected to the manifold.
Figure 4:
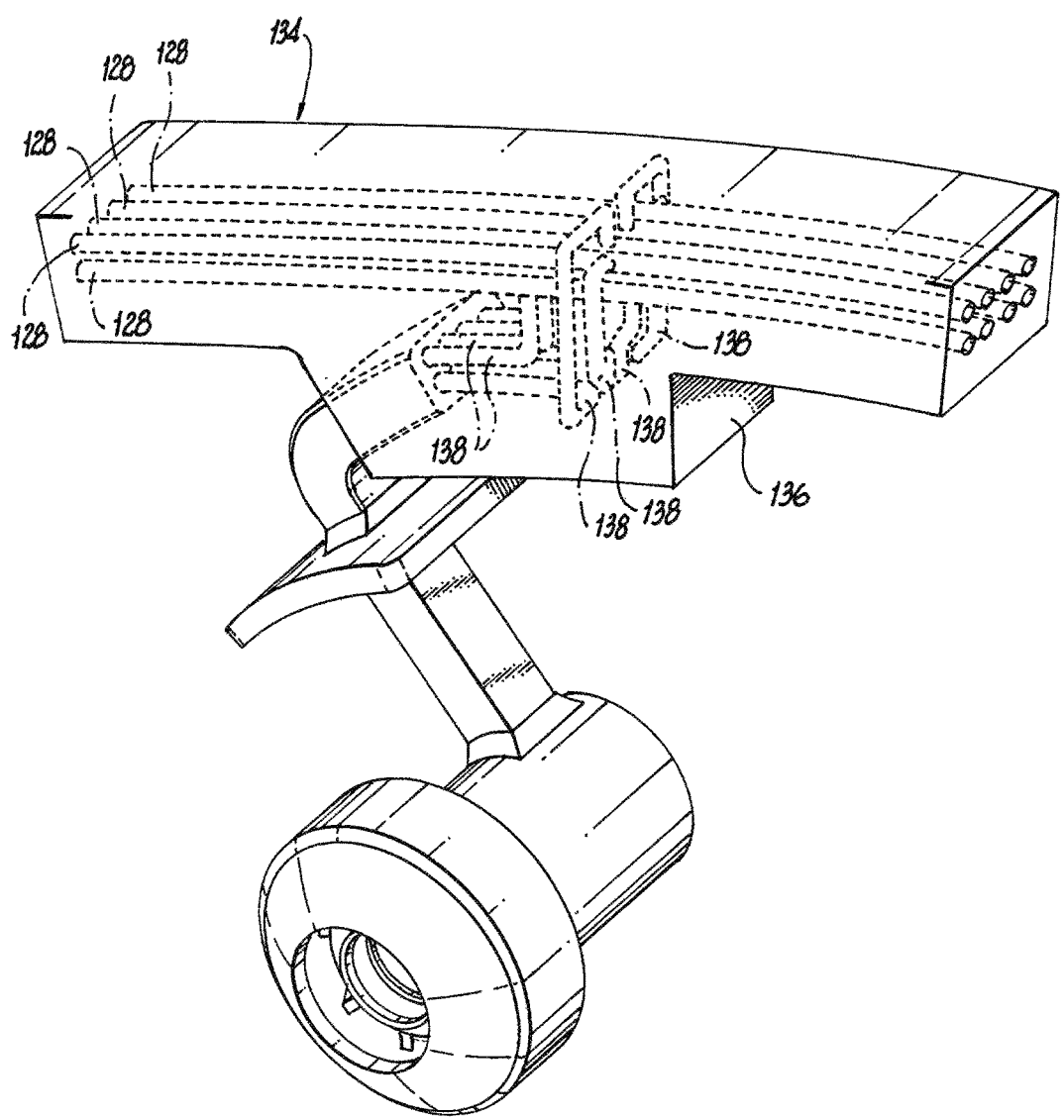
FIG. 4 is a schematic perspective view of a portion of the system of FIG. 3, showing the junction connecting one of the injectors to a segment of the manifold assembly.

With reference now to FIG. 3, a fuel injection system 200 includes a fuel manifold assembly 126 defining a plurality of fuel feed circuits 128, which are labeled in FIG. 4. System 200 also includes a plurality of fuel injectors 100, wherein for each of the fuel injectors 100, each of the fuel circuits 112 is in fluid communication with a respective one of the fuel feed circuits 128.

Each of the fuel feed circuits 128 can include a respective valve 130 for controlling flow to a respective individual fuel circuit 112 in each fuel injector 100. A control system 132 is operatively connected to fuel manifold assembly 126, e.g., by the eight lines schematically indicated in FIG. 3, to control flow to each of the eight fuel feed circuits 128.

As indicated schematically in FIG. 4, where fuel feed circuits 128 are shown in solid lines for clarity as though segment 134 were transparent, the fuel feed circuits 128 can all be defined as internal passages within a single manifold ring. The manifold ring can be circumferentially segmented into a plurality of manifold segments 134. For a plurality of the manifold segments 134, each includes a respective junction 136 connecting between a respective one of the fuel injectors 100 and the respective manifold segment 134. A respective fuel feed circuit branch 138 connects between each respective fuel feed circuit 128 and a respective fuel circuit 112 of the respective fuel injector 100. This transition between manifold assembly 126 and each injector 100 maintains separation of the eight fuel pathways so that each fuel feed circuit 128 only feeds a single fuel circuit 112 in each of the fuel injectors 100.

In this way, controller 132 can receive pressurized fuel from a fuel source, indicated in FIG. 3 by the heavy arrow, and can allocate fuel flow to any single circuit 112 in the fuel injectors 100, so that each of the injectors 100 issues fuel from the same number of fuel circuits 112 as the other injectors 100. It is also contemplated that multiple fuel sources can be used to pressurize control system 132. Only one valve 130 is required for each fuel feed circuit 128, and individual valves at each injector 100 are not therefore required. This provides potential benefits including reduced cost to manufacture, reduced weight, and reduced overall system complexity, compared to traditional systems.

Optionally, control system 132 can be configured to individually control fuel circuits 112 of individual fuel injectors 100 independent of the fuel circuits 112 of the other fuel injectors 100. This can be accomplished, for example with individual valves in each of the branches 138 in system 100, each of which can be operatively connected to control system 132. This option is indicated by the dashed line from control system 132 to some of the junctions 136 in FIG. 3 (dashed lines are omitted for some of the junctions 136 only for sake of clarity). This can provide considerable flexibility over traditional staging systems, since any single fuel circuit 112 in a single injector 100 can be staged on or off, independent of the fuel circuits 112 in the same injector 100 and independent of what the other injectors 100 are doing. This allows for significantly improved pattern factor and temperature profile control compared to traditional staging systems, and can allow for optimization of performance of combustors and life of downstream components in gas turbine engines.

The injectors and manifold assemblies described herein can be fabricated using any suitable techniques, including additive manufacturing. While shown and described in the exemplary context of having all of the fuel feed circuits 128 defined within a single manifold ring, those skilled in the art will readily appreciate that some or all of the fuel feed circuits can be individually manifolded without departing from the scope of this disclosure.

The systems and method described herein provide for the possibility of improved maintenance of fuel pressure for a given mass flow rate compared to traditional systems. This can be particularly advantageous at low power where fuel in traditional systems tends to pool at bottom injectors due to gravity. The systems and methods described herein can provide for significantly fuller fuel manifolds compared to traditional systems, and can therefore provide quicker response to fuel control commands, for example. Due to the large number of fuel stages possible with the systems and methods described herein compared to traditional systems, smoother staging curves can be achieved. Individually fed fuel slots in a fuel nozzle can offer better control of combustion temperature patterns at specific times in a mission compared to traditional configurations.

The methods and systems of the present disclosure, as described above and shown in the drawings, provide for fuel staging with superior properties including potential advantages such as reduced cost, weight, and complexity, while making possible improved performance and control flexibility. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A fuel injector comprising:
   a feed arm with an inlet end and a nozzle body extending from the feed arm at an end opposite the inlet end, wherein the nozzle body defines a prefilming chamber that opens into an annular outlet orifice for issuing a spray therefrom; and
   a plurality of fuel circuits defined from the inlet end of the feed arm to the prefilming chamber of the nozzle body, wherein the plurality of fuel circuits includes at least three fuel circuits in fluid isolation from one another from the inlet end of the feed arm to the prefilming chamber, and wherein each of the fuel circuits includes a single respective conduit extending through the feed arm and nozzle body from the inlet end of the feed arm to a single respective outlet slot feeding into the prefilming chamber for allocating fuel to any single circuit in the plurality of fuel circuits for independent staging of flow through each outlet slot.

2. The fuel injector as recited in claim 1, wherein each fuel circuit in the plurality of fuel circuits includes a single respective inlet opening at the inlet end of the feed arm, with the single respective conduit extending through the feed arm and nozzle body from the single respective inlet opening to the single respective outlet slot feeding into the prefilming chamber.

3. The fuel injector as recited in claim 1, wherein each respective outlet slot is a metering orifice opening into the prefilming chamber.

4. The fuel injector as recited in claim 3, wherein each metering orifice opens at an angle of 30° to 60° relative to the circumference of the prefilming chamber so that a substantially uniform spray can issue from the annular outlet orifice even if only one of the fuel circuits is active.

5. The fuel injector as recited in claim 1, wherein the nozzle body defines an airblast nozzle with an outer air circuit defined outboard of the prefilming chamber, and with an inner air circuit defined inboard of the prefilming chamber, for airblast injection of fuel from the outlet orifice.

6. A fuel injection system comprising:
   a fuel manifold assembly defining a plurality of fuel feed circuits; and
   a plurality of fuel injectors as recited in claim 1, wherein for each of the fuel injectors, each of the fuel circuits is in fluid communication with a respective one of the fuel feed circuits.

7. The system as recited in claim 6, wherein each of the fuel feed circuits includes a respective valve for controlling flow to a respective individual fuel circuit in each fuel injector.

8. The system as recited in claim 6, further comprising a control system operatively connected to the fuel manifold assembly to individually control each of the fuel circuits of each of the individual fuel injectors in the plurality of fuel injectors independent of the fuel circuits of the other fuel injectors.

9. The system as recited in claim 6, wherein the fuel feed circuits are all defined as internal passages within a single manifold ring.

10. The system as recited in claim 9, wherein the single manifold ring is circumferentially segmented into a plurality of manifold segments.

11. The system as recited in claim 10, wherein for the plurality of manifold segments each includes a respective junction connecting between a respective one of the plurality of fuel injectors and a respective one of the plurality of manifold segments, wherein a respective fuel feed circuit branch connects between each respective one of the plurality of fuel feed circuits and a respective fuel circuit of the respective one of the plurality of fuel injectors.

* * * * *